(12) United States Patent
Maganas et al.

(10) Patent No.: US 6,235,247 B1
(45) Date of Patent: May 22, 2001

(54) APPARATUS FOR LOW TEMPERATURE DEGRADATION OF DIESEL EXHAUST AND OTHER INCOMPLETE COMBUSTION PRODUCTS OF CARBON-CONTAINING FUELS

(76) Inventors: Thomas C. Maganas, 1200 Ardmore, Manhattan Beach, CA (US) 90266; Alan L. Harrington, 425 Cirby Way #63, Roseville, CA (US) 95678

(*) Notice: Subject to any disclaimer, the term of this patent is extended or adjusted under 35 U.S.C. 154(b) by 0 days.

(21) Appl. No.: 09/307,145

(22) Filed: May 7, 1999

Related U.S. Application Data

(63) Continuation-in-part of application No. 09/257,458, filed on Feb. 25, 1999, now abandoned, and a continuation-in-part of application No. 08/985,339, filed on Dec. 4, 1997, now Pat. No. 5,928,618.

(51) Int. Cl.$^7$ .............................. F27B 15/14; F27B 15/16
(52) U.S. Cl. .......................... 422/146; 422/171; 422/173; 422/174; 422/177; 422/139; 60/299; 60/300; 423/213.2; 423/245.3; 423/247
(58) Field of Search ..................... 422/139, 143, 422/144, 145, 146, 147, 171, 177, 173, 174; 423/212, 213.2, 224, 235, 239.1, 245.3, 246, 247, 248; 60/299, 300

(56) References Cited

U.S. PATENT DOCUMENTS

| | | | |
|---|---|---|---|
| 2,956,865 | * 10/1960 | Williams, Sr. | 422/171 |
| 3,632,304 | * 1/1972 | Hardison | 423/245.3 |
| 3,714,071 | 1/1973 | Michalko | 502/8 |
| 3,841,242 | 10/1974 | Sigg | 110/257 |
| 3,915,890 | * 10/1975 | Soldate | 423/659 |
| 3,922,975 | * 12/1975 | Reese | 110/216 |
| 4,052,173 | 10/1977 | Schultz | 48/202 |
| 4,308,806 | 1/1982 | Uemura et al. | 110/244 |
| 4,330,513 | * 5/1982 | Hunter et al. | 423/245.3 |

(List continued on next page.)

FOREIGN PATENT DOCUMENTS

| | | |
|---|---|---|
| 0176123 A1 | 4/1986 | (EP) . |
| 0 605 719 A1 | * 7/1994 | (EP) . |
| 2687765 A1 | 2/1992 | (FR) . |
| 2701223 A1 | 8/1994 | (FR) . |
| 541962 | 12/1941 | (GB) . |
| WO 93/24207 | 12/1993 | (WO) . |

OTHER PUBLICATIONS

Agarwal, Kedar, Pyrolysis of Polymer Waste, pp. 232–245, Society of Plastic Engineers, "Plastics Recycling: Technology Charts the Course," (Nov. 4, 1994).

(List continued on next page.)

*Primary Examiner*—Marian C. Knode
*Assistant Examiner*—Basia Ridley
(74) *Attorney, Agent, or Firm*—Workman, Nydegger & Seeley

(57) ABSTRACT

Systems and apparatus for catalytically oxidizing organic matter, particularly the incomplete combustion products of carbon-containing fuels such as fossil fuels. The systems and apparatus utilize catalytically reactive particles that are suspended by moving air within a reaction chamber and maintained at a temperature sufficient to cause the suspended media particles, typically silica sand, silica gel, or alumina, to become catalytically reactive in the presence of moisture. Typically, the reaction chamber is maintained at a temperature in a range from about 100° C. to about 500° C. Moisture may be provided by the waste exhaust, although additional moisture may be introduced into the reaction chamber in order to maintain reactivity of the catalytically reactive particles. The systems and apparatus can be adapted to be used in combination with diesel engines or other internal combustion engines and industrial burners. The exhaust gases containing the incomplete combustion products can be further pressurized as needed. Such systems also reduce nitrogen oxides (NOx).

20 Claims, 3 Drawing Sheets

U.S. PATENT DOCUMENTS

| | | | |
|---|---|---|---|
| 4,497,637 | 2/1985 | Purdy et al. | 48/111 |
| 4,623,400 | 11/1986 | Japka et al. | 148/283 |
| 4,701,312 * | 10/1987 | Kice | 423/213.7 |
| 4,708,067 * | 11/1987 | Narisoko et al. | 110/245 |
| 4,724,776 * | 2/1988 | Foresto | 110/235 |
| 4,761,270 * | 8/1988 | Turchan | 423/235 |
| 4,886,001 | 12/1989 | Chang et al. | 110/346 |
| 4,974,531 | 12/1990 | Korenberg | 110/346 |
| 4,977,840 | 12/1990 | Summers | 110/346 |
| 4,991,521 | 2/1991 | Green et al. | 110/347 |
| 5,010,830 | 4/1991 | Asuka et al. | 110/347 |
| 5,178,101 * | 1/1993 | Bell | 122/4 D |
| 5,181,795 | 1/1993 | Circeo, Jr. et al. | 405/128 |
| 5,335,609 | 8/1994 | Nelson et al. | 110/346 |
| 5,347,936 | 9/1994 | Thorhuus | 110/260 |
| 5,676,070 | 10/1997 | Maganas et al. | 110/245 |
| 5,928,618 * | 7/1999 | Maganas et al. | 358/1.15 |

OTHER PUBLICATIONS

Durham et al., Carbothermal Synthesis of Silicon Nitride: Effect of Reaction Conditions, 31–37,211,213–215, J. Am. Ceram. Soc., vol. 74 [1] (1991).

Guedes De Carvalho et al., Mass Transfer Around Carbon Particles Burning In Fluidised Beds, 63–70, Trans.IChemE., vol. 69, Part A (1991).

Homsy et al., Report Of A Symposium On Mechanics Of Fluidized Beds, 477–495, J. Fluid Mech., vol. 236 (1992).

Jean et al., Fluidization Behavior Of Polymeric Particles In Gas–Solid Fluidized Beds, 325–335, Chemical Engineering Science, vol. 47, No. 2 (1992).

Kuipers et al., A Numerical Model Of Gas–Fluidized Beds, 1913–1924, Chemical Engineering Science, vol. 47, No. 8 (1992).

Molerus, O., Heat Transfer In Gas Fluidized Beds, Part 1, 1–14, Powder Technolody, 70 (1992).

Shafey et al., Experiemental Study On A Bench–Scale, Batch–Type Fluidized–Bed Combustor For Energy Production From Waste–Derived Fuels, 331–338, Energy, vol. 17, No. 4 (1992).

Conversion Technology, Inc., Source Test Report: Fluid Bed Stripping For Particulates, Metals, POHCS, (1991).

Seghers Engineering, Segers Zerofuel: A Concept For Autothermal Sludge Incineration (1992).

* cited by examiner

APPARATUS FOR LOW TEMPERATURE DEGRADATION OF DIESEL EXHAUST AND OTHER INCOMPLETE COMBUSTION PRODUCTS OF CARBON-CONTAINING FUELS

RELATED APPLICATION

This application is a continuation-in-part of U.S. application Ser. No. 08/985,339, filed Dec. 4, 1997, U.S. Pat. No. 5,928,618, and also a continuation-in-part of U.S. application Ser. No. 09/257,458, filed Feb. 25, 1999, now abandoned. For purposes of disclosure, the foregoing applications and patent are incorporated herein by specific reference.

BACKGROUND OF THE INVENTION

FIELD OF THE INVENTION

The present invention is in the field of catalytic degradation of organic waste and pollutants. More particularly the present invention is in the field of methods and systems for low temperature catalytic degradation of organic matter, particularly soot and other incomplete combustion products produced by internal combustion engines, such as diesel engines, and industrial burners, such as those that burn coal, fuel oil or other carbon-containing fuels.

REVIEW OF THE RELEVANT TECHNOLOGIES

Modern society has mastered the art of producing new goods but struggles to dispose of its wastes. While recycling can reduce the overall waste stream, there is still a huge amount of waste that simply does not lend itself to be recycled. The United States generates approximately 180,000,000 pounds of municipal solid waste every year, most of which is disposed in landfills. However, landfills are becoming a scarce commodity.

Most conventional thinking regarding the destruction of industrial, medical or municipal waste has revolved around some form of combustion, incineration or other extreme temperature solution. Because of the complexities and high temperatures utilized, these systems are expensive, must be centrally located, and are operated by highly trained technicians. While combustion, burning or incineration has proven effective in reducing the overall weight and volume of many wastes, these methods have not provided a truly effective solution to our society's current waste management problems. Because of the need to centrally locate combustion, burning or incineration systems, waste materials must be picked up, delivered and then destroyed at the central site. However, just as landfills are becoming increasing difficult to open, incinerators often face greater opposition due to the perception that they are heavy polluters.

Another unfortunate problem associated with the modern economy involves pollutants that are produced by burning carbon-containing fuels, mainly fossil fuels, such as by internal combustion engines and industrial burners. In response to pollution caused by gasoline-powered internal combustion engines, catalytic converters have been developed to reduce the levels of incomplete combustion pollutants that are emitted into the environment as a result of the burning of gasoline. Catalytic converters are typically positioned in-line with the exhaust system of an internal combustion engine and are generally able to catalytically convert most of the unburnt hydrocarbons into $CO_2$ and water.

Conventional catalytic converters contain palladium or platinum, which are coated on top of carrier beads or pellets made of inert and heat-resistant materials in order to increase the surface area of the active catalyst and keep them from simply blowing out the exhaust pipe. Surface coating a less expensive substrate with the catalytic metal also decreases the cost of the catalyst particles since most catalytic metals tend to be quite expensive. Because lead-based additives added to some gasolines can "poison" or destroy the usefulness of the catalyst, such additives have more recently been effectively banned.

Although modern catalytic converters can be used to convert unburnt hydrocarbons to carbon dioxide ($CO_2$) and water, they are generally only feasible for use with gasoline-powered vehicles. They are less suitable for use with diesel engines. Because of the nature of diesel engines, both in terms of the fuel that is burned as well as the way in which the fuel is burned, diesel engines produce substantial quantities of soot and other unburnt hydrocarbons which are too plentiful to be efficiently converted into $CO_2$ and water using reasonably sized and priced catalytic converters. Although they are known to generate substantial quantities of airborne pollution, diesel engines have been largely exempted from the stringent air quality guidelines presently applied to gasoline-powered vehicles for largely economic reasons. Diesel engines are used for most long-haul shipping such as by tractor-trailers and trains and their elimination might cause dire economic problems.

More recently, however, public concern has translated into increased political pressure to strengthen emission standards for diesel engines. There is a possibility that emission guidelines will be imposed in certain states that may be difficult, if not impossible, to meet in an economically feasible manner using conventional catalytic converters. The tendency of diesel engines to produce soot and other unburnt hydrocarbons at a rate that is many times that produced by gasoline-powered engines would require the use of far greater amounts of expensive catalyst using existing technology. However, one of the reasons why diesel engines have been exempted from air pollution standards in the first play is the tremendous cost that would be incurred in fitting diesel engines with conventional catalytic converters. Such costs would undoubtedly burden the economy and possibly cause an economic recession if draconian emission standards were suddenly to be implemented without an economically feasible way to reduce the pollution produced by diesel engines.

In response to pollution controls directed to industrial burners sophisticated scrubbers and after burners have been developed in attempts to satisfy such pollution standards. However, these and other pollution reduction means can be quite expensive, both in retrofitting older industrial burners as well as in the fabrication of new ones.

In view of the foregoing, it would be an significant advancement in the art to provide methods and systems that could effectively and inexpensively eliminate, or at least substantially reduce, the quantity of unburnt or partially burnt combustion products produced by diesel engines and other internal combustion engines in an economically feasible manner.

It would be a further advancement in the art to provide methods and systems for eliminating, or at least greatly reducing, the quantity of incomplete combustion products produced by diesel engines and other systems that burn fossil fuels which could eliminate the need for expensive catalysts, such as palladium, platinum and other rare metals.

It would yet be an advancement in the art if such methods and systems could be easily adapted, such as by upscaling or downscaling, in order to catalytically degrade waste combustion products produced by virtually any system that burned carbon-containing fuels, such as diesel trucks, trains, other vehicles, power plants, metal smelters, and virtually any industrial burner.

Such methods and systems for catalytically destroying unburnt soot, waste hydrocarbons and other incomplete combustion products produced by burning carbon-containing fuels are disclosed and claimed herein.

SUMMARY AND OBJECTS OF THE INVENTION

The present invention relates to improved methods and systems for the complete and reliable degradation of soot and other unburnt organic materials found in the exhaust of internal combustion engines and from the burning of carbon-containing fuels in general. Such methods and systems are especially useful for the catalytic degradation of soot, unburnt hydrocarbons and other incomplete combustion products produced by diesel engines and industrial burners, such as coal or fuel oil fired power plants, metal smelters and the like. Rather than using expensive catalysts such as those presently used to catalyze the conversion of hydrocarbons to $CO_2$ and water, the present invention utilizes particles such as silica, alumina, and the like which can be made to be catalytically reactive under appropriate conditions. Such particles are believed to be capable of generating highly reactive hydroxyl and other oxidative moieties on their surface under such conditions.

Although the technology of providing a fluidized bed of inert silica and alumina to cause the pyrolysis or cracking of certain organic materials has been known, it was heretofore unknown that such particles could be made catalytically reactive under certain conditions. An example of a fluidized bed is found in European Patent Application Publication No. 0,176,123, filed Aug. 26, 1985, in the name of Geeroms (hereinafter "EU '123"), which discloses a "whirl bed" comprising a metal chamber, inert fluidizable particles such as silica, means for introducing heated gases through the fluidizable particles, and an afterburner for burning any gases that are formed by pyrolysis. The purpose for the whirl bed in EU '123 is to clean metal parts upon which paint, rubber, or other hard-to-remove substances have adhered. EU '123 appears to rely, however, on the combination of the abrasive action of the whiling sand media and a high enough temperature (preferably 650° C. or above) in order to effect the mechanical and pyrolytic removal of the adhered organic substances to clean the metal parts. EU '123 does not teach that at lower temperatures and in the presence of moisture such particles exhibit the ability to catalytically convert organic materials such as soot, unburnt hydrocarbons and other incomplete combustion products of carbon-containing fuels to $CO_2$ and/or water.

In contrast to the generally accepted view that silica and alumina are inert fluidized bed particles, the inventors of the present technology have discovered that an abundance of very reactive hydroxyl radicals and other reactive hydrogen oxide species (and possibly other oxide species) are apparently generated which are capable of catalytically degrading soot, unburnt hydrocarbons and other incomplete combustion products into $CO_2$ and/or water at temperatures below combustion temperatures. It is believed that moisture present in many exhaust streams as well as other organic matter that has been tested creates a surface phenomenon on the silica and alumina particles that actually allows for the catalytic conversion of incomplete combustion products to $CO_2$ and water.

In a preferred embodiment, the silica and/or alumina particles are suspended or fluidized in a fairly static condition against the force of gravity by means of air flowing upwards through the particles. Such airflow can be provided by any gas pressurizing means known in the art, including turbines, pumps, the inherent pressure generated by internal combustion engines, and combinations of the foregoing. Suspending or fluidizing the particles greatly increases the active surface area of the silica and/or alumina particles by separating them slightly and allowing for more gas-to-particle contact. Through chemical mechanisms not wholly understood, the environment immediately on or surrounding the surfaces of the suspended particles is able to catalytically degrade soot, unburnt hydrocarbons and other incomplete combustion products generated by the burning of carbon-containing fuels.

In a preferred embodiment, the reaction chamber in which the suspended particles are caused to become suspended is preferably maintained at temperatures in a range from about 100° C. to about 500° C., more preferably in a range from about 175° C. to about 450° C., and most preferably in a range from about 250° C. to about 375° C. Such temperatures are preferred in view of their being generally within the temperature range of exhaust gases generated by internal combustion engines after passing through the exhaust system. Although such temperatures are preferred, the catalytic oxidation of soot, hydrocarbons and other incomplete combustion products of carbon-containing fuels at any temperature through the use of silica and/or alumina would be within the scope of the present invention.

The heat necessary to maintain the reaction chamber within the desired temperature range can be provided by any source. In a preferred embodiment, the heat will be provided substantially, or even exclusively, by the exhaust gases themselves. Nevertheless, it is certainly within the scope of the invention to supplement the heat found in exhaust gases by means of electric heaters, burning fuels such as methane gas, by recycling heat recovered from other sources, or by any other heat source that is able to provide a desired quantity of heat in order to maintain the reaction chamber within a desired temperature range. For example, at initial startup of a diesel engine, or after extensive idling or downhill travel, the exhaust gases generated by the diesel engine may be too cold to adequately heat the reaction chamber. In such cases it may be desirable to provide supplemental heating in order to raise and then maintain the temperature in order to ensure efficient catalytic conversion of soot, hydrocarbons and other incomplete combustion products to $CO_2$ and water.

Providing an oxygen-rich environment also seems to increase the oxidative breakdown of the organic wastes, although breakdown is also observed even in an oxygen-poor environment within the reaction chamber so long as the media particles have been exposed to some degree of moisture. The apparatus may optionally include means for introducing a variety of gases within the reaction chamber, such water vapor, oxygen, ammonia, etc. One such means for introducing gases are the air jets used to suspend the media. Another might be a separate port feeding into the reaction chamber.

In a preferred embodiment, the means for suspending the media, maintaining the temperature at the desired level, introducing exhaust gases to be treated, and optionally introducing oxygen and water vapor rich gas into the reaction chamber comprise air jets for introducing gases into the reaction chamber at a preferred temperature and velocity. In many cases it will not be necessary to enrich the reaction chamber with water vapor since exhaust gases typically contain abundant water vapor formed during combustion. Moreover, unburnt hydrocarbons and hydrogen molecules that are catalytically treated by the silica and/or alumina may produce additional moisture that is available to maintain the necessary level of moisture within the reaction chamber. Sensors can be placed within the reaction chamber in order to regulate the inputs of water vapor, oxygen, heat, etc.

Because of the extremely simple apparatus used to carry out the reaction process, it is possible to greatly upscale or downscale the reaction apparatus size to accommodate a wide variety of uses and applications. The reaction chambers may be very large or utilized in series in order to serve large industrial needs such as coal or petroleum fired power plants, smelters and the like. Alternatively, they may be downsized and adapted for use in catalytically treating exhaust gases produced by internal combustion engines, e.g., diesel-, gasoline-, and propane-powered engines.

Exhaust gases from the burning of carbon-containing fuels typically comprises incomplete combustion products, which may include carbon soot, gaseous, liquid or particulate hydrocarbons, carbon monoxide, and diatomic hydrogen, among other compounds. Actual laboratory testing has shown that passing exhaust gases produced by a diesel engine through a reaction chamber containing fluidized silica particles greatly reduces both the level of soot produced by the combustion of diesel fuel as well as carbon monoxide. Such pollutants are believed to be converted into $CO_2$ or a mixture of $CO_2$ and water.

In addition, nitrogen oxides (NOx) are reduced by about 90%, presumably to nitrogen gas or silicon nitride while carbon, carbon monoxide, and hydrocarbons are being oxidized to carbon dioxide and water. Perhaps the reactions are interrelated.

In view of the foregoing, it is an object of the invention to provide methods and systems that can effectively and inexpensively eliminate, or at least substantially reduce, the quantity of unburnt or partially burnt combustion products produced by diesel engines and other internal combustion engines.

It is a further object and feature of the invention to provide methods and systems for eliminating or at least greatly reducing the quantity of incomplete combustion products produced by diesel engines and other systems that burn fossil fuels which eliminate the need for expensive catalysts such as palladium, platinum and other rare metals.

It is yet another object of the invention that such methods and systems can be easily adapted, such as by upscaling or downscaling, to catalytically degrade waste combustion products produced by virtually any system that burns carbon-containing fuels, such as engines, vehicles both large and small, power plants, metal smelters, and virtually any industrial burner.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity in detail to the use of the accompanying drawings in which.

DETAILED DESCRIPTION OF THE PREFERRED EMBODIMENTS

Figure 1:
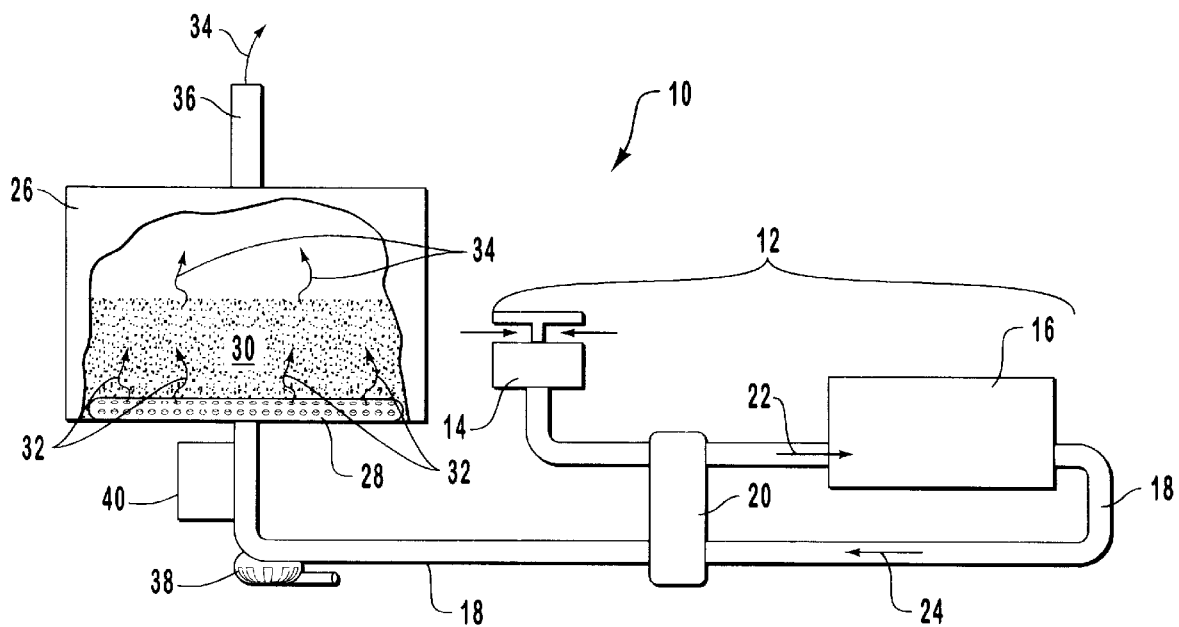
FIG. 1 is a cross-section view of a preferred reaction chamber used in combination with a diesel engine for oxidizing incomplete combustion products.

The present invention relates to improved methods and systems for catalytically oxidizing incomplete combustion products produced by the burning of carbon-containing fuels. Such methods and systems may be used, for example, in the catalytic oxidation of incomplete combustion products produced by internal combustion engines, such as diesel engines, and industrial burners, such as power plants, metallurgical smelting and the like.

Carbon-containing fuels, when not completely oxidized during combustion, can yield finely divided carbon particles (soot), unburnt hydrocarbons, carbon monoxide, hydrogen gas, and the like. Whereas U.S. Pat. No. 5,676,070 discloses methods and systems that may be used in disinfecting and catalytically oxidizing organic waste materials such as medical wastes and corpses, it was not known at that time that such methods and systems could be used in modified form to catalytically oxidize unburnt organic particulates and gases found in diesel exhaust, flue exhaust from industrial burners, and other incomplete combustion products from the burning of fossil fuels and other carbon-containing fuels. For purposes of generally teaching methods and systems used in the catalytic oxidation of organic waste materials, the foregoing patent is incorporated herein by specific reference.

In a preferred embodiment, the invention relates to improved methods and systems for catalytically oxidizing incomplete combustion products found in exhaust that is generated by the burning of fossil fuels by internal combustion engines and industrial burners. In a most preferred embodiment, such methods and systems are especially useful in treating the incomplete combustion products produced by diesel engines. The incomplete combustion products (usually together with the entire exhaust stream) is passed through a reaction chamber containing a suspended media of silica, alumina or a mixture thereof. Through mechanisms which are not entirely understood it has been found that a fluidized bed of silica, without any special catalysts added thereto, is somehow able to catalytically oxidize the vast majority of carbonaceous soot and carbon monoxide found in the exhaust stream. Alumina is also believed to work in catalytically oxidizing incomplete combustion products, although silica is preferred.

The terms "degrade" or "degradation", as used in the specification and the appended claims, refer to the breakdown of larger organic molecules within the organic waste material into smaller organic molecules, mainly through the catalytic cleavage of carbon-carbon bonds. These terms shall also refer to the cleavage of any other molecular bonds during the process of gasifying and oxidizing. The terms also include the complete oxidation of organic gases or particulates into carbon dioxide, water, and/or other oxidation products.

The term "incomplete combustion products", as used in the specification and the appended claims, shall refer to incompletely oxidized reaction products that are formed during combustion or other rapid or incomplete oxidation processes involving carbon-containing fuels. The incomplete combustion products may consist of, for example, gases, solid particulates, liquids, or mixtures thereof. Incomplete combustion products typically include carbon soot, unburnt hydrocarbons, whether in particulate or in vaporous form, carbon monoxide, hydrogen gas, and the like. The term "carbon soot" is a subset of the term "incomplete combustion products" and includes unburnt and residual carbonaceous and hydrocarbon particulates.

The term "carbon-containing fuel" shall be understood to refer to any organic material that may be combusted or burned in order to generate or release energy, usually in the form of heat, light or a combination thereof. The term "fossil fuel" is a subset of "carbon-containing fuel" and includes coal, oil, natural gas, derivatives of coal, natural gas and oil, and the like.

Reference is now made to FIG. 1, which illustrates a first embodiment of a catalytic system 10 adapted for use in treating the incomplete combustion products produced by an internal combustion engine. The internal combustion engine may be a diesel engine 12, or may alternatively be other internal combustion engines or other devices that burn fossil fuels. Catalytic system 10 functions to more fully oxidize the incomplete combustion products of an internal combustion engine in a fashion similar to conventional catalytic converters but without the need for expensive metallic catalysts, such as palladium, platinum and the like.

A typical diesel engine 12 comprises an air intake 14, a combustion chamber 16, and an exhaust channel 18. A turbocharger 20 is configured to compress an intake air/fuel mixture 22 that is fed into the combustion chamber 16 in order to increase the efficiency of the diesel engine 12 by supplying more combustion air initially. The turbocharger is often configured to communicate with the exhaust channel 18, with the flow of exhaust gases providing force for driving the turbocharger.

Waste exhaust products 24 are discharged from the combustion chamber 16 into the exhaust channel 18. In FIG. 1, the exhaust channel 18 is depicted as providing an uninterrupted conduit that directs the waste exhaust products 24 into a reaction chamber 26. However, any appropriate means for introducing the waste exhaust products 24 into the reaction chamber 26 may be employed. The majority of waste exhaust products 24 typically consist of inert nitrogen gas, carbon dioxide, water, and some oxygen gas. However, due to non-ideal air/fuel ratios, incomplete mixing, inefficiencies inherent during acceleration, or other reasons, some of the diesel fuel used in diesel engine 12 may not be completely burned into $CO_2$ and water. As a result, incomplete combustion products, most notably carbon soot, unburnt particulate and gaseous hydrocarbons, and carbon monoxide are produced in significant quantities by the diesel engine 12. Such incomplete combustion products are often visible, particularly during the acceleration phase of a diesel powered vehicle when combustion is least efficient.

The waste exhaust products 24 are introduced into the reaction chamber 26 by means of one or more diffusion pipes 28. The diffusion pipe 28 includes a plurality of holes or passages distributed therethrough which allows for a desired distribution pattern of the waste exhaust products 24 throughout the reaction chamber 26. The waste exhaust products 24 are more particularly diffused throughout catalytically reactive particles 30 located within the reaction chamber 26 as diffused exhaust gases 32. The catalytically reactive particles 30 consist essentially of silica, alumina, or mixtures thereof. The term "consist essentially of" should be understood to mean that the catalytically reactive particles mainly consist of silica, alumina or mixtures thereof, but they may include minor quantities of impurities such as metals and ash typically found in silica and/or alumina. Moreover, whereas the silica and/or alumina are themselves catalytically reactive such that expensive catalysts such as palladium and platinum are unnecessary, inclusion of such materials in minor amounts in order that the silica and/or alumina still perform the majority of catalytic activity would be within the scope of the present invention.

In a preferred embodiment the catalytically reactive particles 30 are "fluidized," as that term is understood in the art, meaning that at least a portion of the particles are elevated by rising gases such that they are not in a state of natural particle packing density. Fluidizing or elevating the particles leaves them in a much less compacted state. This fluidized or elevated state yields particles having a surface area that is more accessible and available for contact with the diffused exhaust gases 32 rising through the particles 30. Increased surface contact with the diffused exhaust gases 32 increases the catalytic activity of the reactive particles 30 vis-a-vis the diffused exhaust gases 32. As the diffused exhaust gases 32 rise through the catalytically reactive particles 30 they are catalytically oxidized into reaction products having a higher oxidation state, such as carbon dioxide, water and some ash. As they rise through, and are catalytically oxidized by, the catalytically reactive, particles the diffused exhaust gases 32 become treated exhaust gases 34. The treated exhaust gases 34 exit the reaction chamber 26 by means of an outlet or stack 36.

As stated above, it is preferable for the catalytically reactive particles 30 to be in a fluidized or suspended state in order to increase their available surface area and ability to catalytically react with the diffused exhaust gases 32. In some cases, the waste exhaust products 24 themselves will have sufficient pressure to cause the catalytically reactive particles 30 to become fluidized or otherwise partially suspended. However, in the case where the waste exhaust products 24 have insufficient pressure to cause adequate fluidization or levitation of the catalytically reactive particles 30, it may be necessary, or at least preferable, to increase the pressure of the waste exhaust products 24 prior to their being introduced into the reaction chamber 26. This may be done by means of a compressor 38 or other compressing means known in the art. In many cases the pressure of the waste exhaust products 24 will depend on the rate at which the diesel engine is consuming diesel fuel and will typically correspond to the number of RPMs at which the engine is running. At higher RPMs the exhaust gases will typically have adequate pressure to cause at least partial fluidization of the catalytically reactive particles 30. However, at lower RPMs the waste exhaust products 24 may require assistance by means of the aforementioned compressor 38.

An information feed-back mechanism (not shown) may be utilized to determine whether or not the compressor 38 needs to be activated at any particular point in time as well as the degree of pressurization to be imparted to the waste exhaust products 24. One of ordinary skill in the art will be able to adjust the amount of compression imparted by the compressor 38 depending on the requirements of the overall catalytic system 10.

It is preferable for the reaction chamber 26 to be maintained at a temperature in a range from about 100° C. to about 500° C., more preferably in a range from about 175° C. to about 450° C., and most preferably in a range from about 250° C. to about 375° C. Such temperatures are preferred in view of their being generally within the temperature range of waste exhaust gases generated by internal combustion engines after passing through the exhaust system. Although such temperatures are preferred, the catalytic oxidation of soot, hydrocarbons and other incomplete combustion products of carbon-containing fuels at any temperature by means of silica and/or alumina particles is within the scope of the invention.

Waste exhaust products 24 typically leave the diesel engine 12 at temperatures of about 400° C. to about 550° C. However, the waste exhaust products 24 typically begin to cool after leaving the diesel engine 12 and after passing through the exhaust channel 18. In order to preserve as much of the heat generated by the diesel engine 12 as possible it is preferable to position the reaction chamber 26 in relation to the diesel engine 12 so that the waste exhaust products 24 do not cool to temperatures below the preferred operating temperature of the catalytic system 10. In addition, various insulating means known in the art may be utilized in order to preserve a desired amount of the heat produced by burning fuel within the diesel engine 12 and found within the waste exhaust products 24 as they leave combustion chamber 16.

In the event that it is desired to increase the temperature of the waste exhaust products 24, it may be desirable to utilize an auxiliary heater 40 in order to increase the temperature of the waste exhaust products 24 prior to their entering into the reaction chamber 26. In addition, the auxiliary heater 40 may optionally be configured so as to provide moisture as needed to maintain the reactivity of the catalytically reactive particles. Nevertheless, the waste exhaust products 24 will themselves generally provide adequate moisture in the form of combustion water produced by the oxidation of hydrocarbons.

In alternative embodiments, the fluidization of the catalytically reactive particles 30 may be carried out by means of an auxiliary air input system (see FIG. 3, item number 104–120) which act independently of the force of the waste exhaust products 24 being introduced into the reaction chamber 26 through the diffusion pipe(s) 28. In addition, auxiliary heating means (see FIG. 3, item number 88) located within the reaction chamber 26 may be used in order to maintain the reaction chamber 26 at a desired temperature, particularly at start up when the diesel engine is cold and the waste exhaust products 24 are too low to maintain the reaction chamber 26 at the desired temperature. Finally, in the event that the waste exhaust gases are too hot such that their temperature is higher than the desired operating temperature of the reaction chamber 26, it may be necessary to provide cooling means (not shown) in order to maintain the waste exhaust products 24 at a desired temperature.

It is also advantageous to select catalytic reactive particles 28 that have a relatively high specific surface area. It is believed that it is at the surface of the reactive particles 28 where the reactive hydroxyl radicals are generated. Accordingly, increasing the surface area of the particles 28 without increasing their weight allows for the use of a lower mass of reactive particles 28 while maintaining a desired level of reactivity of the catalytic system 10. Reduced weight is particularly desirable in the present embodiment, since reaction chamber 26 is typically installed in and carried by a diesel-powered vehicle. The amount of silica and/or alumina particles that are needed may be significantly reduced when the grain size is reduced and/or the surface of the particles is made to be more irregular, both of which tend to increase the specific surface area of the particles.

It should also be appreciated that reducing the amount of silica or other reactive particles generally reduces the percentage of carbon soot and other incomplete combustion products that are removed from waste exhaust products 24. Thus, the preferred amount of silica and/or alumina is determined by a trade-off involving the weight of the catalytic system 10 on the one hand, and the extent to which one wishes to catalytically oxidize the waste exhaust products 24 on the other.

The catalytically reactive particles 28 facilitate the oxidation of the incomplete combustion products found in the waste exhaust products 24. In particular, at least carbon soot and unburnt hydrocarbons and other organic gases are converted into carbon dioxide and water, while other incomplete combustion products may be converted into more fully oxidized counterparts. Even carbon monoxide found in diesel exhaust has been shown to be greatly reduced when diesel exhaust is passed through fluidized silica particles.

Figure 2:
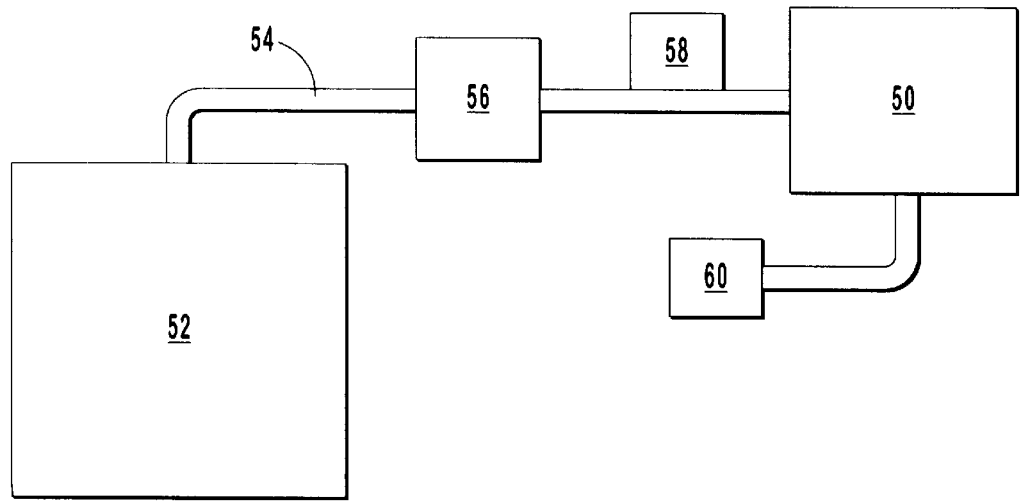
FIG. 2 is a schematic view of a reaction chamber used in combination with an exhaust flue of an industrial burner.

The catalytic systems according to the present invention can be modified, such as by upscaling or downscaling, to catalytically oxidize virtually any waste exhaust streams that include incomplete combustion products of carbon-containing fuels. For example, FIG. 2 is a schematic diagram depicting a reaction chamber 50 upsized and configured for use in catalytically oxidizing incomplete combustion products produced by an industrial burner 52. Such industrial burners 52 commonly burn coal, coke, fuel oil, natural gas, or derivatives of coal, petroleum or natural gas, all of which are capable of generating incomplete combustion products such as soot, unburnt or partially burnt hydrocarbons, and carbon monoxide. Industrial burners 52 are utilized in a wide range of industrial operations, such a power generation, metal smelting, manufacturing, and the like.

Exhaust gases produced by the industrial burner 52 are carried from the burner 52 to the reaction chamber 50 by means of an exhaust conduit or channel 54. A compressor 56 may be used to ensure that the exhaust gases produced by the industrial burner 52 are fed into reaction chamber 50 with adequate pressure. An in-line introducer of auxiliary inputs 58 may be used in order to ensure adequate heat and/or moisture content of the exhaust gases before they are introduced into the reaction chamber 50. In addition, or alternatively, heat and/or moisture may be introduced by means of an off-line or parallel introducer of auxiliary inputs 60 connected separately to the reaction chamber 50. Introducer 60 may also be used to independently fluidize or at least partially suspend the catalytically reactive particles of silica or alumina located within the reaction chamber 50.

Figure 3:
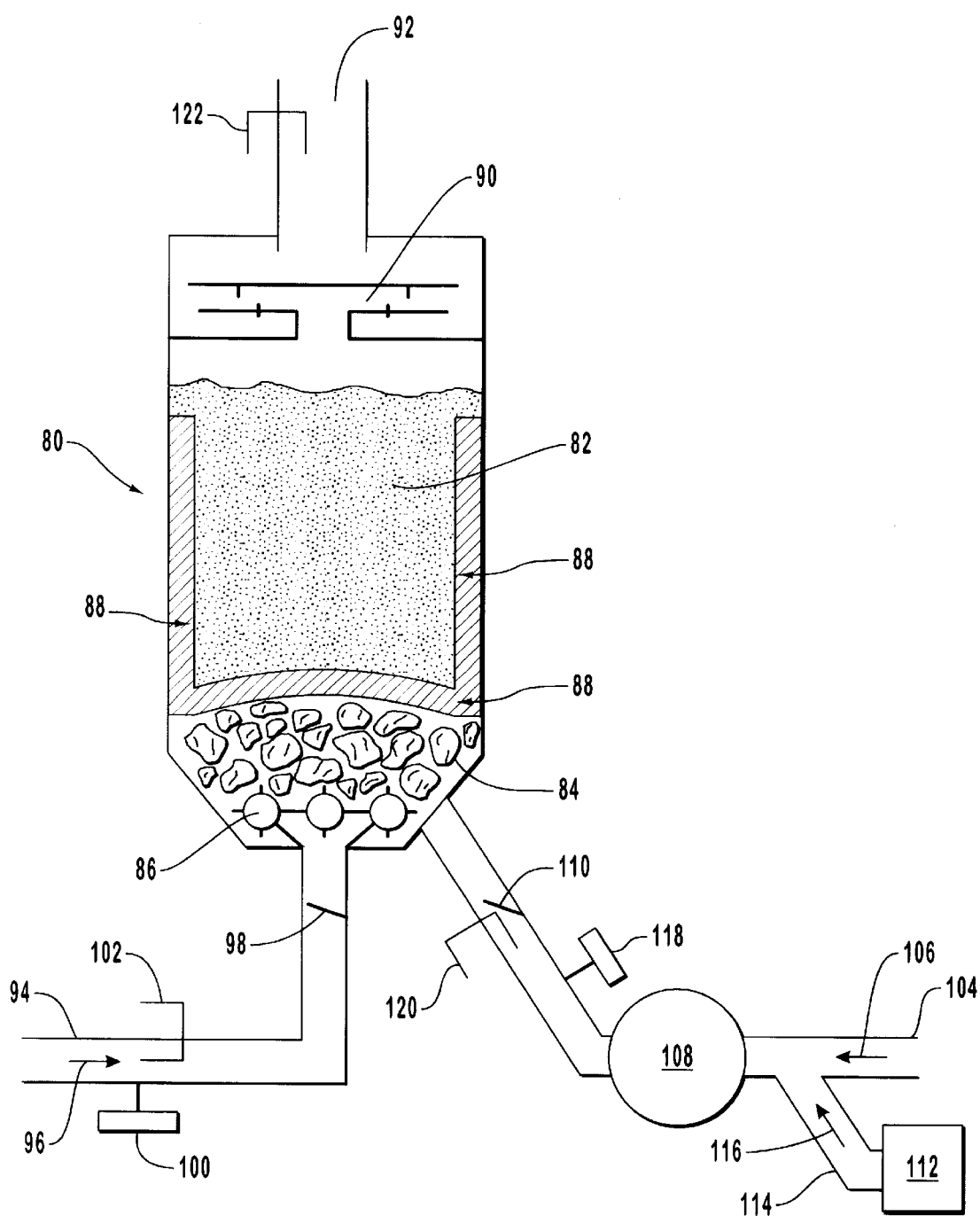
FIG. 3 is a cross-section view of an alternative embodiment of a reactive chamber according to the invention.

In order to illustrate another preferred embodiment of a catalytic system according to the present invention, reference is now made to FIG. 3. Depicted therein is a reaction chamber 80 that includes therein catalytically reactive particles 82 comprising silica, alumina or a combination thereof. The bed of catalytically reactive particles 82 sits atop a bed of rocks 84 surrounding porous introduction tubes 86 in order to more evenly distribute waste exhaust gases emitted by the porous tubes 86 and into the catalytically reactive particles 82. An auxiliary heating element 88 that provides resistive heat is disposed around the inner circumference of the reaction chamber 80 in order to provide additional heat if needed during operation of the reaction chamber 80. Exhaust gases that have been treated by reaction chamber 80 are preferably removed from the reaction chamber 80 by passing them through a cyclone filter 90 and out an exhaust stack 92.

Exhaust gases 96 are introduced into the reaction chamber 80 by means of an exhaust channel 94 communicating between reaction chamber 80 and an internal combustion engine (not shown), such as a diesel engine or some other source of waste gases, such as an industrial burner. The exhaust channel 94 may further be equipped with an anti-backflow trap 98 in order to ensure essentially one-way flow of exhaust gases 96 into the reaction chamber 80. The exhaust channel 94 may optionally be equipped with a pressure tube 100 for measuring the pressure of the exhaust gases 96. A Pitot tube 102 may also be employed to measure the velocity of the exhaust gases 96.

In order to assist the exhaust gases 96 in heating, and/or fluidizing the catalytically reactive particles 82 within the reaction chamber 80, an auxiliary air input system may be employed. Such an auxiliary input system preferably includes an air input channel 104 through which air 106 can be introduced into the reaction chamber 80. The air is compressed and accelerated by means of an air turbine 108. An anti-backflow trap 110 may be used to ensure one-way flow of air 106 into the reaction chamber 80 and in order to prevent unwanted escape of exhaust gases 96 through the air input channel 104.

A heating unit 112 may also be employed for introducing heated air into air input channel 104. A heated air channel 114 communicating between the heating unit 112 and air input channel 104 directs heated air 116 into air channel 104. An optional pressure tube 118 may be used to measure pressure, while an auxiliary Pitot tube 120 may be used to measure the velocity, of the air 106 being input into the reaction chamber 80. Finally, a Pitot tube 122 may be used within the exhaust stack 92 in order to measure the velocity of the treated exhaust gases exiting the exhaust stack 92.

Figure 4:
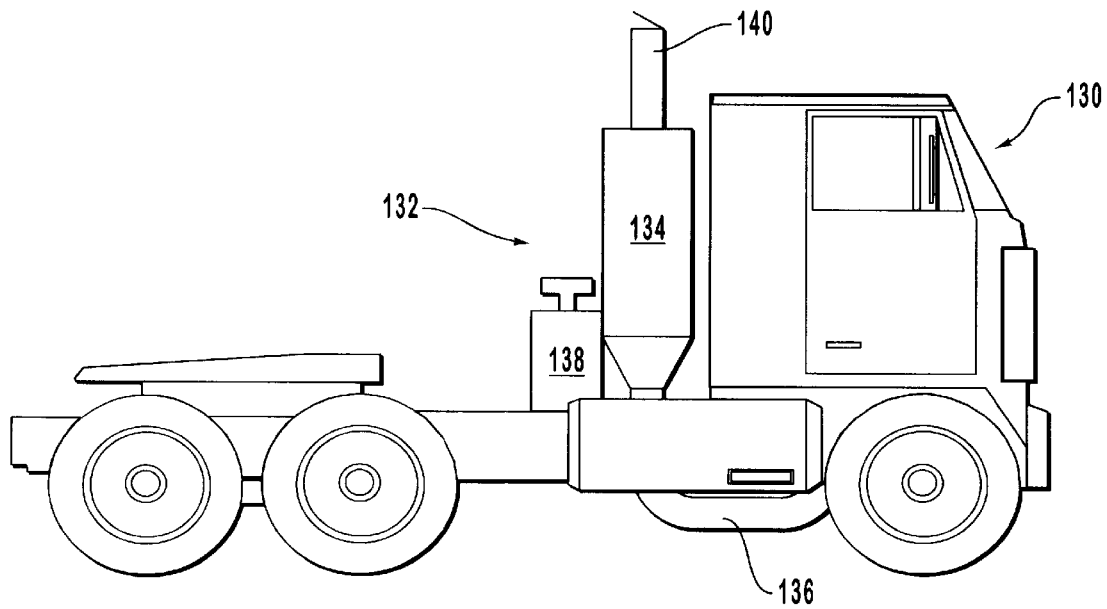
FIG. 4 is a partial cross-section view of a reaction chamber sized and configured for use with a diesel-powered tractor-trailer rig.

FIG. 4 depicts a diesel tractor trailer 130 equipped with a catalytic system 132, more particularly a reaction chamber 134, sized and configured for convenient use with the tractor-trailer 130. Exhaust gases from the tractor-trailer are introduced into the reaction chamber 134 by means of an exhaust channel 136. A turbine 138 may be used to introduce additional air into the reaction chamber 134 in order to provide adequate fluidization of catalytically reactive particles located therein. In addition, or alternatively, the turbine 138 may be used to increase the pressure of the exhaust gases themselves before being introduced into the reaction chamber 134. The treated exhaust gases are expelled from the reaction chamber 134 through an exhaust stack 140.

Figure 5:
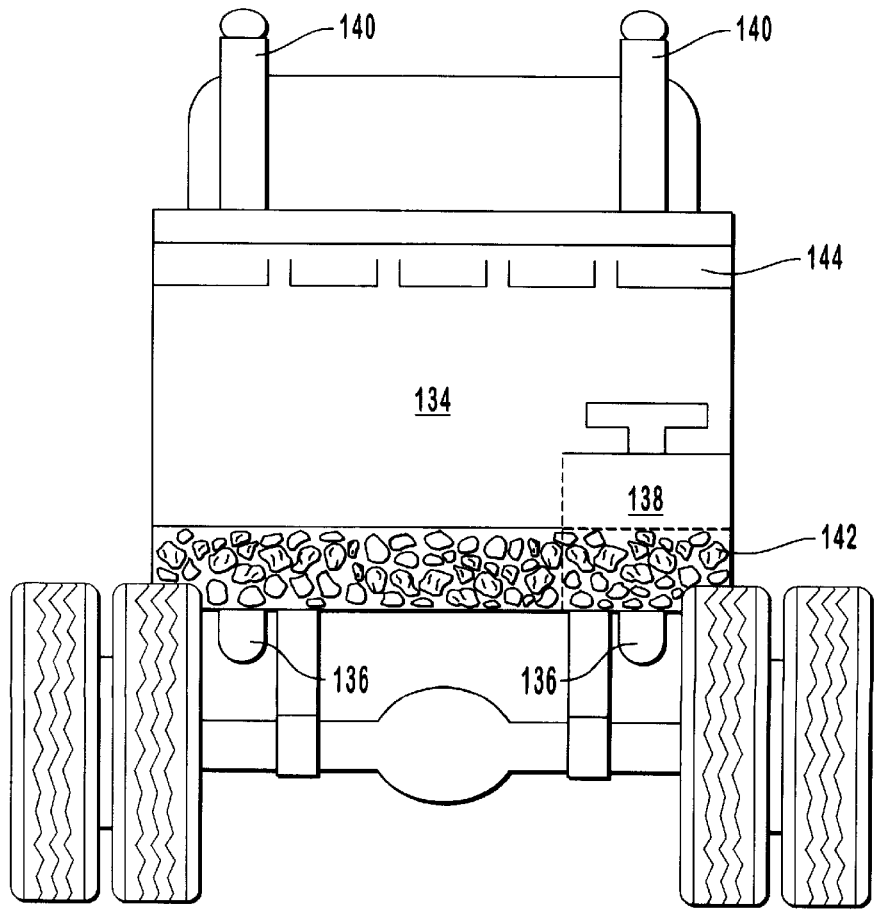
FIG. 5 is a rear cross-section view of a reaction chamber configured to approximate the width of a diesel-powered tractor-trailer rig.

FIG. 5 is a rear view of the catalytic system 132 depicted in FIG. 4 showing that the reaction chamber 134 can occupy substantially the entire width of the tractor trailer 130. FIG. 5 further depicts a bed of rocks 142 used to assist the distribution of waste exhaust gases throughout the reaction chamber 134, as well as cyclone filters 144 through which the treated exhaust gases pass before escaping through the exhaust stacks 140.

Several examples of embodiments of the invention are presented in order to demonstrate the practicability and usefulness the invention.

EXAMPLE 1

Silica particles were suspended within a reaction chamber that was maintained at a temperature of 420–425° C. A piglet corpse weighing about 35–40 lbs. was placed into the reaction chamber and submerged within the fluidized silica sand. After 45 minutes, the reaction chamber was opened up and inspected. Nothing remained of the piglet corpse: there were no bones, no teeth, no tissues that could be detected, which proved that the media particles under the above-stated conditions became highly reactive and were able to completely oxidize the entire piglet corpse. That the silica sand was catalytically reactive rather than inert was demonstrated by the fact that the reaction chamber was kept at a temperature far below the temperature required for a corpse to combust.

EXAMPLE 2

Waste tissues and other organic materials were placed within a reaction chamber on a regular and ongoing basis. The reaction chamber was operated according to the methods disclosed herein and maintained at a temperature of 300–375° C. It was found that an afterburner was not needed to burn off excess gases during operation of the reaction chamber, since essentially no flammable gases could be detected. It was determined that the medical waste and other organic matter that was disposed was completely oxidized, leaving no detectable solid residue except for a quantity of ash. The quantity of the ash that remained after disposal was found to be about 2% by weight of the organic matter that was initially disposed. The most preferred operating temperature was determined to be within a range from about 300° C. to about 375° C.

EXAMPLE 3

A reaction chamber similar to the one depicted in FIG. 3 and which included silica sand as the catalytically reactive media was adapted for use with a diesel engine. The diesel engine that was utilized for this experiment included a pair of exhaust pipes at the rear of the vehicle. A pair of rubber hoses were attached to the respective pair of exhaust pipes and joined together in a Y union to form a single exhaust conduit leading to the underside of the reaction chamber. A heating/compressor unit was also used in conjunction with the reaction chamber in order to introduce heated air under pressure into the reaction chamber as needed in order to provide a fluidized bed of silica sand heated to a temperature in a range from about 200° C. to about 375° C. In addition, a series of tubes configured and arranged so as to sample untreated exhaust gases as well as treated exhaust gases were interfaced with various analytical devices in order to test the level of waste products in the exhaust gases both before and after treatment by the reaction chamber.

In order to establish a benchmark for how much catalytic oxidation was being carried out by the reaction chamber, untreated exhaust gases were fed through a draw tube and caused to pass through a filter paper for a period of ten minutes in order to trap waste exhaust particulates, ie. soot. After 10 minutes the filter paper was removed and inspected. A very noticeable buildup of black carbon soot was found on the filter paper.

Thereafter, exhaust gases that were treated by means of the reaction chamber were fed into a draw tube and caused to pass through a filter paper for a period of 10 minutes. Subsequent inspection of the filter paper revealed a remarkable drop in the level of soot that was collected, perhaps up to 95% or more. Whereas the untreated exhaust gases caused a build up of black soot on the filter paper that was easily transferred to a person's fingers, the treated exhaust yielded a faintly gray build up of material that did not easily rub off. Whereas these respective buildups of soot were not quantified a visual inspection showed a drop of at least 75–95% of soot compared to the untreated exhaust.

In addition, the level of carbon monoxide was measured both before and after treatment with the reaction chamber and found to be reduced by about 90%. This indicated that the catalytically reactive media particles were able to catalytically oxidize carbon monoxide to carbon dioxide in a short period of time as the waste exhaust gases rose through the catalytically reactive silica particles.

In addition, the level of nitrogen oxides ($NO_x$) was measured both before and after treatment with the reaction chamber and were also found to be reduced by about 90%. This indicated that the catalytically reactive media particles were able to catalytically eliminate nitrogen oxides in a short period of time as the waste exhaust gases rose through the catalytically reactive silica particles. They were most likely reformed into silicon nitride. Alternatively, they may have been reduced to nitrogen gas as the carbon, carbon monoxide and hydrocarbons were oxidized to carbon dioxide.

This experiment was repeated numerous times and each time there was a noticeable drop in the level of carbon soot, carbon monoxide and nitrogen oxides as a result of passing the waste exhaust gases through the reaction chamber. This demonstrated that the silica particles are catalytically reactive since merely passing a stream of exhaust gases through an inert bed would not be expected to cause further oxidation of any incomplete combustion products found therein. The dramatic increase in the rate and extent of oxidation of the incomplete combustion products strongly indicates the catalytic capabilities of silica sand relative to waste exhaust gases.

Through subsequent experiments it was found that about 100 pounds of silica sand is adequate to catalytically degrade up to 95% of the incomplete combustion products produced by a diesel engine having a displacement of 400 cubic inches. Moreover, it was found that the silica sand did not degrade but could be used almost indefinitely without being depleted. Of course, in the event that the reaction chamber needs to be recharged with silica sand, it can be done so at very low cost. Sand is a very inexpensive commodity compared to conventional catalysts.

EXAMPLE 4

Further experiments were carried out using the apparatus described in Example 3, except that the silica sand was not fluidized as much but was kept in only a slightly elevated state. Furthermore, after the diesel engine was warmed up all auxiliary heat was cut off such that the only heat input into the reaction chamber was provided by the diesel engine exhaust. A series of measurements indicated that the temperature leveled off and remained at about 180° C. The treated exhaust gases were sampled and found to be virtually emission free. In particular, the filter paper used to sample particulates from the treated gases remained virtually clean over time (i.e. after sampling for more than 10 minutes), which indicated that over 99% of the particulates were being oxidized without any additional heat inputs.

Thereafter, large filter paper was placed over the opening of the exhaust stack itself for at least 10 minutes to ensure that the sampling techniques used above were not flawed in some way. The large filter paper was examined and appeared to be virtually clean, which indicated that virtually no particulates were passing through the reaction chamber and into the atmosphere. In short, simply passing waste exhaust gases through a slightly fluidized bed of ordinary silica sand resulted in the virtual elimination of all waste particulates found in diesel engine exhaust. This test confirms that ordinary silica sand can behave as a powerful catalyst in catalytically oxidizing incomplete combustion products of diesel fuel at temperatures as low as about 180° C. without the use of expensive conventional catalysts.

EXAMPLE 5

A reaction chamber containing silica is used to remove up to 98% of the soot and other unburnt carbonaceous materials emitted in the flue gas from an industrial burner that utilizes coal or fuel oil. Carbon monoxide and nitrogen oxides are also greatly reduced. Because the industrial plant is stationary, and because silica is extremely inexpensive, an amount of silica appropriate for oxidizing the unburnt components from the industrial burners is used. The temperature is maintained within a range from about 100° C. to about 500° C. by appropriate means, and the moisture content of the gases within the reaction chamber is maintained by appropriate means, such as by, e.g., a humidifier.

EXAMPLE 6

A reaction chamber containing a fluidized bed of silica was used to catalyze the incomplete combustion products from a 1990 Geo Metro having approximately 125,000 miles. A conventional emission tester was used to determine the hydrocarbon and carbon monoxide levels both before and after passing the exhaust through the inventive reaction chamber. The 1990 Geo Metro was equipped with a factory-installed catalytic converter, which was left in place to determine if the inventive reaction chamber would further remove unburnt gases and particulates produced by a gasoline-powered engine but not catalytically oxidized by the catalytic converter.

Normal levels of hydrocarbons and carbon monoxide were measured by inserting the sampling pipe into the exhaust pipe of the Geo Metro, which is the standard practice. While running at a speed of 2338 RPMs and no load the Geo Metro was tested for emissions. The hydrocarbon level was determined to be 1412 ppm, while the concentration of CO was detected as 0.29%.

Thereafter, the exhaust stream was diverted and passed directly through the reaction chamber. In order to prevent dilution of the exhaust gases all external sources of air flow, such as heated air inputs, were curtailed. Only the exhaust gases from the Geo Metro were introduced into the reaction chamber during the testing procedure. After correcting for dilution, the hydrocarbon level was determined to be only 22 ppm, while the concentration of CO was measured as 0.00%. This means that the reaction chamber of the invention reduced the hydrocarbon level by about 98.5% while removing virtually all of the CO, or over 99% of the CO. The foregoing test demonstrated that the inventive methods and systems were better able to remove CO and unburnt hydrocarbons more efficiently and completely than standard catalytic converters.

EXAMPLE 7

A reaction chamber containing a fluidized bed of silica was used to catalyze the incomplete combustion products from a 1984 STD Mercedes Benz Diesel. A conventional emission tester was used to determine the hydrocarbon and carbon monoxide levels both before and after passing the exhaust through the inventive reaction chamber. The 1984 STD Mercedes Benz Diesel had no catalytic converter since they are not used with diesel engines due to their ineffectiveness.

Normal levels of hydrocarbons and carbon monoxide were measured by inserting the sampling pipe into the exhaust pipe of the Mercedes Benz Diesel, which is the standard practice. While running at a speed of at least about 2000 RPMs and no load the Mercedes Benz Diesel was tested for emissions. The hydrocarbon level was determined to be 219 ppm, while the concentration of CO was detected as 2.02%.

Thereafter, the exhaust stream was diverted and passed directly through the reaction chamber. In order to prevent dilution of the exhaust gases all external sources of air flow, such as heated air inputs, were curtailed. Only the exhaust gases from the Mercedes Benz Diesel were introduced into the reaction chamber during the testing procedure. After correcting for dilution, the hydrocarbon level was determined to be 0 ppm, while the concentration of CO was measured as 0.01%. This means that the reaction chamber of the invention reduced virtually all of the hydrocarbons, or over 99%, while removing about 99.5% of the CO.

In conclusion, the present invention provides methods and systems that can effectively and inexpensively eliminate, or at least substantially reduce, the quantity of unburnt or partially burnt combustion products produced by diesel engines and other internal combustion engines.

The invention further provides methods and systems for eliminating or at least greatly reducing the quantity of incomplete combustion products produced by diesel engines and other systems that burn fossil fuels without the need for expensive catalysts such as palladium, platinum and other rare metals.

The methods and systems of the present invention can be easily adapted, such as by upscaling or downscaling, to catalytically degrade waste combustion products produced by virtually any system that burns carbon-containing fuels, such as engines, vehicles both large and small, power plants, metal smelters, virtually any industrial burner.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for catalytically oxidizing incomplete combustion products produced by combustion of carbon-containing fuel comprising:
   a reaction chamber;
   means for heating and maintaining the reaction chamber within a temperature range of about 100° C. to about 500° C. during catalytic oxidation of the incomplete combustion products;
   catalytically reactive particles disposed within the reaction chamber and consisting essentially of particles selected from the group consisting of silica, alumina, and mixtures thereof, wherein said catalytically reactive particles are the only reactive particles within the reaction chamber; and
   means for introducing the incomplete combustion products produced by the combustion of the carbon-containing fuel into the reaction chamber in a manner so as to at least partially suspend the catalytically reactive particles within the reaction chamber and in order for the catalytically reactive particles to catalytically oxidize the incomplete combustion products.

2. A system for catalytically oxidizing incomplete combustion products produced by combustion of carbon-containing fuel as defined in claim 1, wherein the reaction chamber is heated and maintained within a temperature range of about 175° C. to about 450° C.

3. A system for catalytically oxidizing incomplete combustion products produced by combustion of carbon-containing fuel as defined in claim 1, wherein the reaction chamber is heated and maintained within a temperature range of about 250° C. to about 375° C.

4. A system for catalytically oxidizing incomplete combustion products produced by combustion of carbon-containing fuel as defined in claim 1, further including an internal combustion engine in gaseous communication with the means for introducing the incomplete combustion products into the reaction chamber, wherein the incomplete combustion products are produced by the internal combustion engine.

5. A system for catalytically oxidizing incomplete combustion products produced by combustion of carbon-containing fuel as defined in claim 4, wherein the internal combustion engine is a diesel engine.

6. A system for catalytically oxidizing incomplete combustion products produced by combustion of carbon-containing fuel as defined in claim 1, further including an industrial burner in gaseous communication with the means for introducing the incomplete combustion products into the reaction chamber, wherein the incomplete combustion products are produced by the industrial burner.

7. A system for catalytically oxidizing incomplete combustion products produced by combustion of carbon-containing fuel as defined in claim 1, wherein the carbon-containing fuel is a fossil fuel selected from the group consisting of coal, coke, oil, natural gas, petroleum derivatives, coal derivatives, natural gas derivatives, and mixtures thereof.

8. A system for catalytically oxidizing incomplete combustion products produced by combustion of carbon-containing fuel as defined in claim 1, wherein the incomplete combustion products are selected from the group consisting of unburnt hydrocarbons, partially burnt hydrocarbons, carbon soot, carbon monoxide, hydrogen gas, and mixtures thereof.

9. A system for catalytically oxidizing incomplete combustion products produced by combustion of carbon-containing fuel as defined in claim 1, wherein the incomplete combustion products further include nitrogen oxides and wherein the system also eliminates at least a portion of the nitrogen oxides.

10. A system for catalytically oxidizing incomplete combustion products produced by combustion of carbon-containing fuel as defined in claim 1, wherein the incomplete combustion products have a pressure, the system further including means for increasing the pressure of the incomplete combustion products prior to introducing them into the reaction chamber.

11. A system for catalytically oxidizing incomplete combustion products produced by combustion of carbon-containing fuel as defined in claim 1, further including a compression mechanism for compressing gases and means for introducing the compressed gases into the reaction chamber, the compressed gases being selected from the group consisting of the incomplete combustion products, air and mixtures thereof.

12. A system for catalytically oxidizing incomplete combustion products produced by combustion of carbon-containing fuel as defined in claim 1, wherein the means for introducing the incomplete combustion products of the carbon-containing fuel into the reaction chamber comprises an exhaust channel in gaseous communication between a source of the incomplete combustion products of the carbon-containing fuel and the reaction chamber.

13. A system for catalytically oxidizing incomplete combustion products produced by combustion of carbon-containing fuel as defined in claim 1, wherein heat generated during combustion of the carbon-containing fuel and contained within the incomplete combustion products comprises at least a portion of the means for heating and maintaining the reaction chamber within the temperature range of about 100° C. to about 500° C.

14. A system for catalytically oxidizing incomplete combustion products produced by combustion of carbon-containing fuel as defined in claim 13, further including an auxiliary heating element which comprises at least a portion of the means for heating and maintaining the reaction chamber within the temperature range of about 100° C. to about 500° C.

15. A system for catalytically oxidizing incomplete combustion products produced by combustion of carbon-containing fuel as defined in claim 13, further including cooling means for maintaining the reaction chamber within the temperature range.

16. A system for catalytically degrading incomplete combustion products produced by combustion of carbon-containing fuel comprising:

a reaction chamber;

means for heating and maintaining the reaction chamber within a temperature range of about 100° C. to about 500° C. during catalytic degradation of the incomplete combustion products;

catalytically reactive particles disposed within the reaction chamber consisting essentially of at least one of silica and alumina, the catalytically reactive particles being at least partially suspended within the reaction chamber during the catalytic degradation of the incomplete combustion products, wherein said catalytically reactive particles are the only reactive particles within the reaction chamber;

an exhaust channel which provides gaseous communication between a source of the incomplete combustion products and the reaction chamber so as to introduce the incomplete combustion products into the reaction chamber in order for the catalytically reactive particles to catalytically degrade the incomplete combustion products.

17. A system for catalytically oxidizing incomplete combustion products produced by combustion of carbon-containing fuel as defined in claim 16, wherein the incomplete combustion products have a pressure and wherein the catalytically reactive particles are at least partially suspended within the reaction chamber by means of a compression mechanism in gaseous communication with the exhaust channel which increases the pressure of the incomplete combustion products and any additional gases that are mixed with the incomplete combustion products.

18. A system for catalytically oxidizing incomplete combustion products produced by combustion of carbon-containing fuel as defined in claim 16, further including means for introducing air into the reaction chamber under pressure in addition to the incomplete combustion products.

19. A system for catalytically oxidizing incomplete combustion products produced by combustion of carbon-containing fuel produced by an internal combustion engine comprising:

a reaction chamber;

means for heating and maintaining the reaction chamber within a temperature range of about 100° C. to about 500° C. during catalytic oxidation of the incomplete combustion products, where said means comprises at least one of an auxiliary heating element or heat produced by the combustion of the carbon-containing fuel and introduced into the reaction chamber together with the incomplete combustion products;

catalytically reactive particles disposed within the reaction chamber consisting essentially of particles selected from the group consisting of silica, alumina, and mixtures thereof, the catalytically reactive particles being at least partially suspended within the reaction chamber during the catalytic oxidation of the incomplete combustion products, wherein said catalytically reactive particles are the only reactive particles within the reaction chamber;

an exhaust channel which provides gaseous communication between the internal combustion engine and the reaction chamber so as to introduce the incomplete combustion products into the reaction chamber in order for the catalytically reactive particles to catalytically oxidize the incomplete combustion products.

20. A system for catalytically oxidizing incomplete combustion products produced by combustion of carbon-containing fuel as defined in claim 19, wherein the catalytically reactive particles consist essentially of silica particles and wherein the internal combustion engine is a diesel engine.

* * * * *

UNITED STATES PATENT AND TRADEMARK OFFICE
CERTIFICATE OF CORRECTION

PATENT NO.   : 6,235,247 B1
DATED        : May 22, 2001
INVENTOR(S)  : Thomas C. Maganas, Alan L. Harrington It is certified that error appears in the above-identified patent and that said Letters Patent is hereby corrected as shown below:

Column 3,
Line 45, before "sand media" change "whiling" to -- whirling --.

Column 8,
Line 36, after "reactive" delete the comma.

Column 9,
Line 47, after "item" change "number" to -- numbers --.

Column 11,
Line 67, after "usefulness" insert -- of --.

Signed and Sealed this

Second Day of April, 2002

Attest:

JAMES E. ROGAN
Director of the United States Patent and Trademark Office

Attesting Officer